Aug. 7, 1945.  J. D. LANGDON  2,381,456
AIRSHIP
Filed Sept. 20, 1941   3 Sheets-Sheet 1
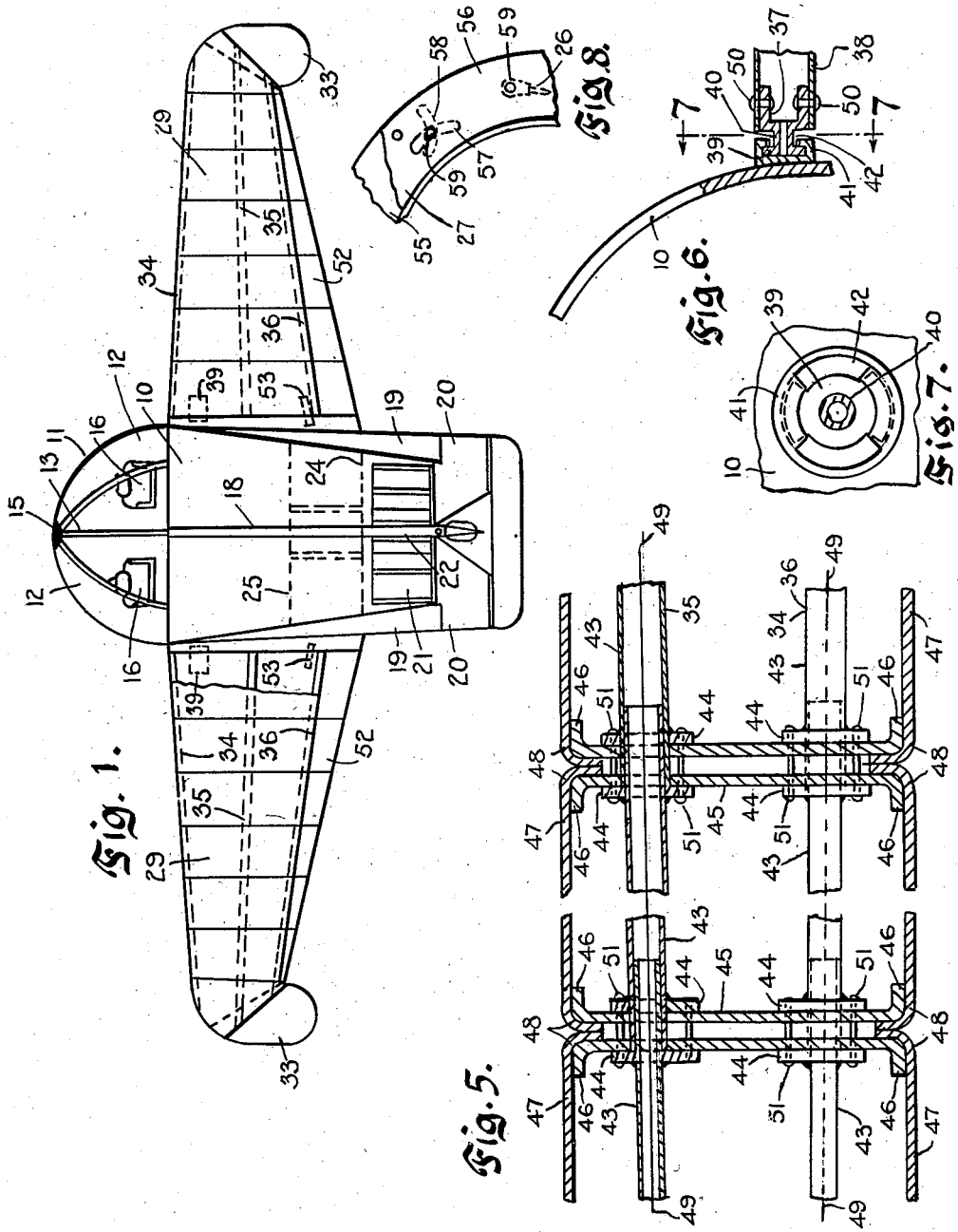
INVENTOR
Jesse D. Langdon
BY
HIS ATTORNEY

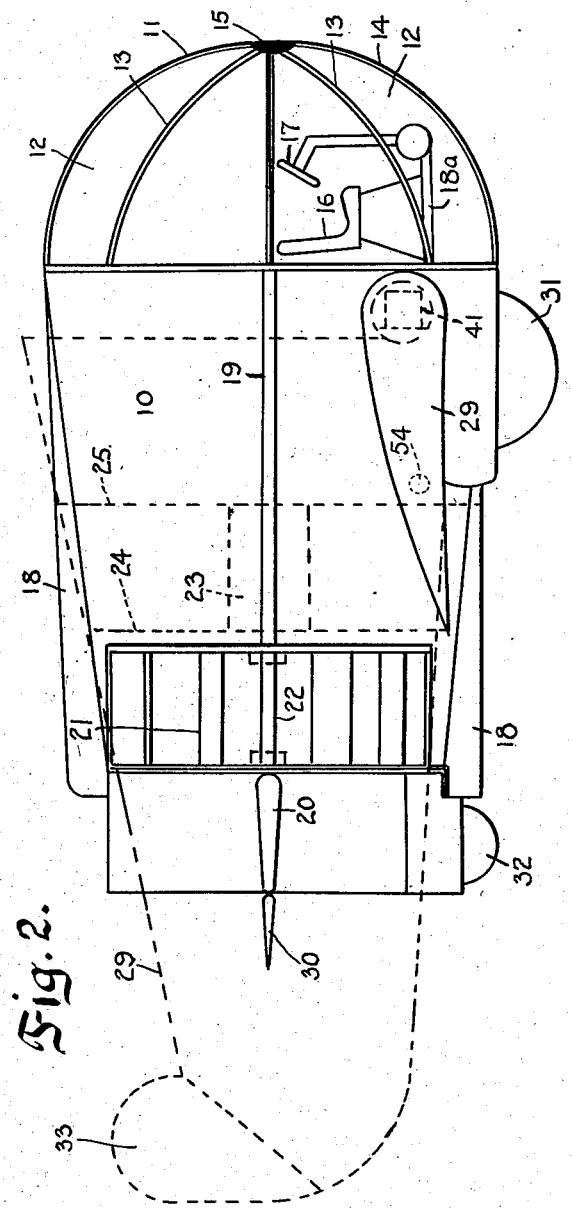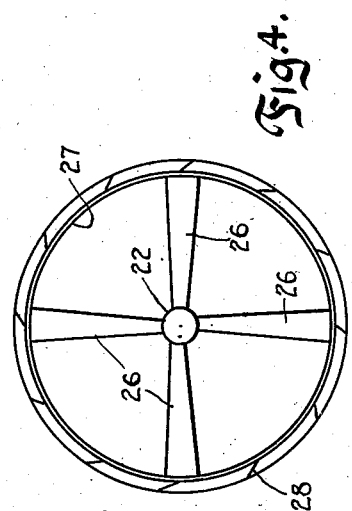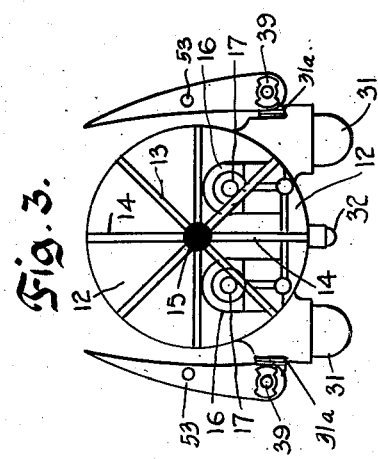

Aug. 7, 1945.　　　　J. D. LANGDON　　　　2,381,456
AIRSHIP
Filed Sept. 20, 1941　　　3 Sheets-Sheet 3

INVENTOR
Jesse D. Langdon
BY
HIS ATTORNEY

Patented Aug. 7, 1945

2,381,456

UNITED STATES PATENT OFFICE 2,381,456

AIRSHIP

Jesse D. Langdon, Downey, Calif.

Application September 20, 1941, Serial No. 411,616

3 Claims. (Cl. 244—124)

My present invention relates to airships, and more particularly to an improved heavier-than-air airship.

My invention contemplates the use of a centripetal propeller in combination with a bullet-shaped fuselage and nacelle whereby the movement of the air past the fuselage is stream-lined and a rocketing effect is produced.

A feature of my invention is the use of a propeller for radially drawing the air inwardly and projecting the air rearwardly of the airship to thereby reduce the head-on impact and frictional resistance of the airship passing through the atmosphere.

A further feature of my invention is the use of a short fuselage capable of housing an engine in such a manner as to facilitate repairs thereto while the airship is in flight.

A further feature of my invention is the provision of a fuselage adapted to carry an engine at approximately the center of gravity of the airship.

A further feature is the provision of means for supercharging the interior of an airship fuselage by means of the driving propeller.

A further feature of my invention is a fuselage in which may be concentrated and balanced a pay load of an airship at about the wing center of the air ship and in definite balancing relation with respect to the center of gravity of the airship.

A further feature of my invention is the provision of wings adapted to be folded to lie lengthwise of the end at each side of the airplane fuselage to thereby cover a revolving propeller and to thus convert the airship into a safe air-propelled road vehicle.

A still further feature of my invention is the provision of sectional wing casings of maximum external smoothness and capable of quick replacement.

A still further feature of my invention is the improved construction of the pilot's room whereby maximum range of visibility from within the fuselage is provided.

Further features of my invention will appear as the description of the invention progresses.

In the accompanying drawings:

Fig. 1 is a top plan view of an airship embodying my invention;

Fig. 2 is a side elevation of the structure shown in Fig. 1 and illustrating in dotted lines the portion of the wings in folded position;

Fig. 3 is a front elevation of the structure shown in Fig. 2;

Fig. 4 is a front elevation of the centripetal propeller utilized in connection with the structure shown in Figs. 1, 2, and 3;

Fig. 5 is a fragmentary sectional detail elevation of the structure of the wings;

Fig. 6 is a detail partly in section of a wing abutment frame;

Fig. 7 is a sectional elevation on the line 7—7 of Fig. 6;

Fig. 8 is a fragmentary detail of the rim of the centripetal propeller showing the mechanism for adjusting the pitch of the propeller blades;

Figure 9:
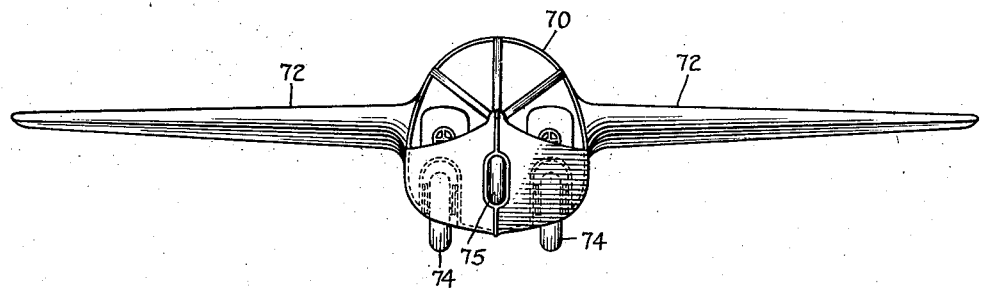
Fig. 9 is a front elevation of an airplane embodying my invention and adapted as an amphibian.

Referring to the drawings, 10 designates the fuselage provided with a hemispherical nose 11 comprised of a plurality of panels 12 of Cellophane or other suitable form of flexible glass-like material held between radial supporting ribs 13 and 14. There are two of the ribs 14 diametrically arranged with respect to each other as seen in Fig. 3, and such ribs are split and attached together by hinge 15 to permit half of the hemispherical nose to swing open and thereby permit entry to the fuselage 10 and cockpit or pilot's cabin in which is located the pilot's seat 16 and controls 17 mounted on an outrigger 18a attached to the structure of the fuselage 10, and projecting forwardly into the transparent nose 11 to thereby provide maximum visibility for the pilot. Secured to and forming part of the fuselage 10 are stabilizing keels 18, secured to the lower part of the body parallelly arranged with respect to each other and spaced apart at any suitable distance. The forward ends of the stabilizing keels 18 are substantially flush with the fuselage, while the rear or trailing ends are almost entirely exposed and thus act as stabilizing surfaces. Preferably the stabilizing keels 18 are formed of flattened tubular metal stock, although any other approved material is satisfactory. In addition to the stabilizing keels 18, which may be called the vertically arranged stabilizing keels, I provide on either side of the fuselage the horizontally arranged stabilizing keels 19, such stabilizing keels also having the forward ends substantially flush with the fuselage, while the rear or trailing ends are almost entirely exposed to thereby act as stabilizing surfaces.

Rearward of and contiguous to the horizontally arranged stabilizing keels 19 are two wide stabilizing surfaces 20 disposed across the slip stream area of the centripetal propeller 21. Associated with the stabilizing surfaces 20 is the flipper stabilizer 30. The fuselage is provided with the usual landing wheels 31 and with a rudder wheel 32.

The propeller 21 has its axis or main shaft 22 attached to the drive shaft of a motor 23, located within an engine chamber formed by a rear bulkhead 24 and a forward bulkhead 25. Suitable connections between the motor 23 and propeller main shaft 22, as well as suitable controls between the motor 23 and pilot controlled mechanism therefore, are provided by such mechanism, but have not been illustrated and need not be further referred to.

The propeller, in addition to the main shaft 22 thereof, has radially extending out from such main shaft the blades 26, to the outer ends of which are connected the rims 27. Extending between the rims 27, which are spaced apart from each other, are the vanes or blades 28. The blades 26 are provided with helical propeller surfaces with the greatest incidence disposed at the outer ends where they are attached to the rims 27 and thus tend to aid the blades 28 in moving the air radially inwardly from the circumference of the propeller 21 and thence outwardly and rearwardly. The forward end of the propeller 21 may also have the inner portions of the blades 26 disposed so as to force air under pressure into the interior of the nacelles of the fuslage lying forward of the bulkhead 25.

The propeller blades 26 may have their angle adjusted to thereby vary the pitch by the construction shown in Fig. 8. In such figure, 55 and 56 are propeller rims provided with slots 57 and 58, respectively, through which extends an adjusting pin 59 attached to the end of a propeller blade. By properly positioning the adjusting pin 59 in the slots 57 and/or 58 the pitch of the propeller blade 26 may be varied.

If desired, an impeller may be located forward of the nose of the ship and driven from a shaft from the motor 23 to force air radially outward from the hemispherical nose 11, thus greatly increasing the efficiency of the airship in the matter of speed. The supercharging of the nacelles in the fuselage 10 may be confined to the engine room formed between the bulkheads 24 and 25, or shutters may be provided in the forward bulkhead 25, whereby the forward cabin may be supercharged at will.

Associated with the fuselage 10 are the wings 29. The wings 29 are pivotally and removably connected from the fuselage and are so constructed as to lie alongside of the sides of the fuselage whereby the side wings may be housed to permit the entire apparatus to be converted into a road machine. The wings 29 are provided at their ends with the tip stabilizers 33. Preferably, in the construction of the wings 29 are utilized three tubular spars 34, 35 and 36, see Fig. 5. The spar 34 is located in the leading edge of the wings, spar 35 runs longitudinally through the center of the wings, and spar 36 inside the trailing edge of each wing. The proximal ends of the spars 34, 35 and 36 are secured to wing abutment frame 37 and proximal panel 38, see Fig. 6, an abutment member 39, connected to abutment frame 37 by member 40, being adapted to interlock with binder pin 40 and flanged locking member 41 which enters orifice 42. The wing abutment frame 37 at the end thereof remote from the member 40 is provided with a binder pin 53 which cooperates with a locking socket 54 in the side of the fuselage 10.

The spars 34, 35 and 36 are built up by a series of tubes 43, see Fig. 5, which telescope into one another against abutting flanges or shoulders 44 which have impinged between them a pair of oppositely flanged panel ribs 45 and oppositely disposed flanges 46 around the outer edges. Said flanges 46 are disposed away from one another to support casing panels 47 which are made of sheet material bent into a U shape with flanges 48 turned inwardly around both edges of the U and at right angles to the flat panel material, these flanges 48 being forced between the panel ribs 45 and the open ends of the U shaped panel 47. These members are brought together and secured at the trailing edge of the wing by riveting, welding or any other suitable manner, thus it will be seen that a perfectly smooth surface is provided around the leading edge and upper and lower surfaces of the wing, the casing panels being locked in position between the flanged panel ribs 45.

A cable or rod 49 is secured at the far end of each spar 34, 35 and 36 furthest from the fuselage and carried through the tubular spars 34, 35 and 36 to the end of the wing adjacent to the fuselage 10 and adjustably attached to the proximal panel 38, see Fig. 6, which is held together by rivets 50. When the rods or cables 49 are tightened, Fig. 5, the tubes 43, flange panel ribs 45 and flanges of the casing panels 47 are all drawn together between the flanges or shoulders 44, making a securely interlocked wing structure. Bolts or rivets 51 may be used for additional strength if desired.

The trailing edge of the wings 29 have tapered ailerons 52 in addition to the stabilizing tip 33 at the ends of the wings. These ailerons and tips provide against flat spinning of the airship and give the ship a wide range of maneuverability for gliding purposes. It will be noted that the compact, balanced, short body of the airship, together with the wing and control surfaces above described makes an ideal glider structure aiding greatly to the safety factor of the device.

Due to the comparatively short length of the fuselage 10 a very compact and roomy body and cabin are formed so that practically all of the engine weight and pay load is located amidships and at the center of gravity. This form of structure greatly enhances the safety of the airship, as it is particularly well balanced for gliding purposes; the ship being neither tail nor head heavy in case of stalling.

The location of the seat 16 projecting forwardly into the hemispherical nose 11 provides a maximum range of visibility for the pilot. A vision range of more than 340 degrees is thereby attained, about 40 degrees being obstructed by the circle of the nose 11.

Figure 10:
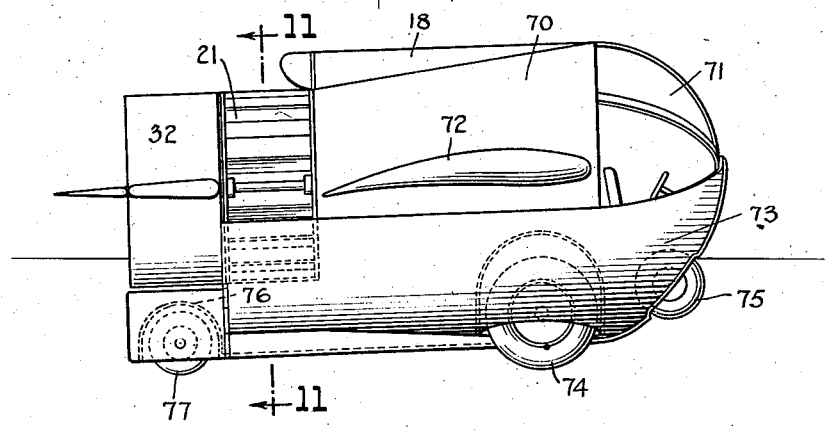
Fig. 10 is a side elevation of the structure illustrated in Fig. 9.
Figure 11:
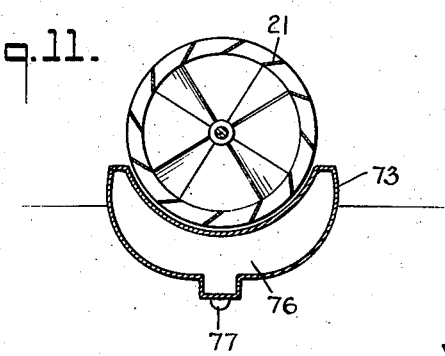
Fig. 11 is a sectional end elevation taken on the line 11—11 of Fig. 10.

Referring now to Figures 9, 10 and 11, wherein is shown an amphibian plane embodying my invention 70 designates fuselage of the same general shape and type of the fuselage shown in Figures 1 and 2, provided in such case with a pilot's cabin 71 and with the wings 72. When adapting the structure for use as an amphibian, I preferably make the same of the modified high wing type as shown in Figure 9, and while in Figure 9 the wings 72 are shown as rigidly connected with the fuselage 70, the wings may be attached to the fuselage in the same manner as the wings 29 illustrated in Figures 1 and 2 so as to permit said wings to be folded alongside of the fuselage 70, not necessarily when the device is on a road but when it is desired to anchor the amphibian in a narrow causeway.

In this modification of my device, the bottom part of the fuselage 70, pilot's cabin 71, and propeller 21 with its casing are partially enclosed by the hull 73 of sufficient free board to insure stability when the structure is in the water and afloat. The structure is provided with front landing wheels 74 and 75 and the trailing wheel 77 which is housed in the lower end of the rudder 32, and the hull 73 and fuselage 70 are provided with chambers, which chambers are open only at the bottom and thus prevent water from passing into the interior of the hull 73. Because of the type of propeller used, that is a centrifugal propeller, the full efficiency thereof is not obtained when the structure is designed as an amphibian plane, but the degree to which the maximum efficiency is cut down is so small as to be practically negligible and the cutting down of the power has seemingly no effect on the driving and operating qualities, as the propeller is completely open rearwardly.

Whereas I have described my invention by reference to specific forms thereof, it will be understood that many changes and modifications may be made without departing from the spirit of the invention.

I claim:

1. A wing structure comprising tubular spars made of assembled longitudinally tubular sections, each section flanged outwardly between its ends and telescopically conjoined with the adjacent sections of the spar, the spaced relationship of the adjoining sections limited by the flanged structure of each section between its ends, to limit the telescopic insertion of one section into another, each section being passed thru a pair of flanged ribs convergently embraced by and between the two ribs which lay parallel to one another transversely of the spars and wing structure; paneled wing surfacing segments extending between the pairs of ribs and being made of suitable sheet material having flanges turned inwardly and running longitudinally of the edge of each segment, the covering segments being of suitable width corresponding with the spaced relationship of each pair of ribs, the outer surfaces of inwardly turned flanges of the segments abutting one another and held between each pair of ribs by the flanges of the telescopic sections which are urged toward one another by tension means extending longitudinally of the spars and thus clamping the adjoining faces of the inwardly disposed flanges in close contact with and against one another, the edges of each segment being secured together rearwardly of the wing section and forming a trailing edge for the wing, the inwardly projecting flange of each segment of the wing being urged edgewise inwardly of the wing and joined together at the rear edge of the wing and means joining the rear of the wing section together.

2. An airship provided with a wing structure as defined by claim 1, said airship being provided with a fuselage, and means for flexibly conjoining said wing structure with fuselage whereby said wing structure is cushioned against shocks and stresses of flight and the engine and propeller torque.

3. A sub-combination of the invention including a wing structure forming a framework to support an airplane wing, comprising longitudinally disposed spars constructed of flanged sections telescoped together end to end, ribs extending transversely of said longitudinally disposed spars, the spars extending thru said transverse ribs spaced by the flanges of said telescopic sections of said spars, the flanges impinging opposite sides of said ribs and tensioned assembly means disposed longitudinally of said spars to clamp said ribs between the flanges of said spars.

JESSE D. LANGDON.